(12) United States Patent
Shi

(10) Patent No.: US 10,321,065 B2
(45) Date of Patent: Jun. 11, 2019

(54) REMOTE COMMUNICATION METHOD, REMOTE COMMUNICATION SYSTEM, AND AUTONOMOUS MOVEMENT DEVICE

(71) Applicant: Panasonic Intellectual Property Management Co., Ltd., Osaka (JP)

(72) Inventor: Hongjie Shi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/003,564

(22) Filed: Jun. 8, 2018

(65) Prior Publication Data

US 2018/0376073 A1    Dec. 27, 2018

(30) Foreign Application Priority Data

Jun. 23, 2017 (JP) ................................ 2017-122932

(51) Int. Cl.
*H04N 5/232* (2006.01)
*G06T 7/20* (2017.01)

(52) U.S. Cl.
CPC .......... *H04N 5/23296* (2013.01); *G06T 7/20* (2013.01)

(58) Field of Classification Search
CPC .......... H04N 7/15; H04N 7/157; H04N 5/072; H04N 7/14
USPC ............................................. 348/14.01–14.16
See application file for complete search history.

(56) References Cited

U.S. PATENT DOCUMENTS

2017/0142349 A1* 5/2017 Oetting .................. H04N 7/157

FOREIGN PATENT DOCUMENTS

| JP | 2004-209562 | 7/2004 |
| JP | 2004-230479 | 8/2004 |
| JP | 2006-146435 | 6/2006 |
| JP | 2007-216363 | 8/2007 |
| JP | 2016208416 A * 12/2016 |

* cited by examiner

*Primary Examiner* — Melur Ramakrishnaiah
(74) *Attorney, Agent, or Firm* — Greenblum & Bernstein, P.L.C.

(57) ABSTRACT

A remote communication method of a remote communication system including a first robot deployed in a first place and a first presentation device deployed in a second place, includes capturing an image of a first user in the first place with a camera, transmitting the captured image of the first user from the first robot to the first presentation device, receiving the captured image from the first robot, displaying the captured image, detecting a first amount of change indicating a change in a position of a second user in the second place with reference to a second robot that virtually represents the first user, transmitting the first amount of change to the first robot, receiving the first amount of change from the first presentation device, and moving the first robot to change a point of view of the camera in response to the first amount of change.

16 Claims, 10 Drawing Sheets

US 10,321,065 B2

REMOTE COMMUNICATION METHOD, REMOTE COMMUNICATION SYSTEM, AND AUTONOMOUS MOVEMENT DEVICE

BACKGROUND

1. Technical Field

The present disclosure relates to a remote communication system that includes a first robot that autonomously moves and captures an image of a first user in a first place, and a first presentation device that presents the image captured by the first robot to a second user, different from the first user, in a second place different from the first place. The present disclosure also relates to a remote communication method of the remote communication system and an autonomous movement device that autonomously moves.

2. Description of the Related Art

Communication performance of robots with humans advance day by day, and telepresence robots that are autonomous robots having teleconference and remote control functionalities have been developed. A telepresence robot that is an avatar of a user as a sender walks around in a remote area, and communicates with a user serving as a communication destination as described in Japanese Unexamined Patent Application Publication No. 2007-216363. The telepresence robot thus gives a sense of presence more than ever to the user as the communication destination while maintaining good communication. As a result, telepresence robots are beginning to be used in work-from-home business, a variety of events, offices, and educational fields.

However, in the related art technique described above, each of persons present in the remote place is unable to have the feeling of presence as if his or her partner were present there, and there is still room for improvement.

One non-limiting and exemplary embodiment provides a remote communication system that provides the feeling of presence to a second user as if a first user in a remote place were there in person, a remote communication method of the remote communication system, and an autonomous movement device.

SUMMARY

In one general aspect, the techniques disclosed here feature a remote communication method of a remote communication system including a first robot deployed in a first place and a first presentation device deployed in a second place different from the first place. The remote communication method includes capturing, using a camera, an image of a first user in the first place, transmitting, using the first robot, the captured image of the first user from the first robot to the first presentation device, receiving, using the first presentation device, the captured image from the first robot, displaying, using the first presentation device, the captured image, detecting, using the first presentation device, a first amount of change indicating a change in a position of a second user in the second place with reference to a second robot that virtually represents the first user, transmitting, using the first presentation device, the first amount of change to the first robot, receiving, using the first robot, the first amount of change from the first presentation device, the first robot moving to change a point of view of the camera in response to the first amount of change.

In accordance with the disclosure, the first robot capturing the image of the first user in the first place moves in concert with the movement of the second user in the second place, and the point of view of the camera of the first robot changes. This setting provides the second user with the feeling of presence as if the first user in the first place were present in the second place.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
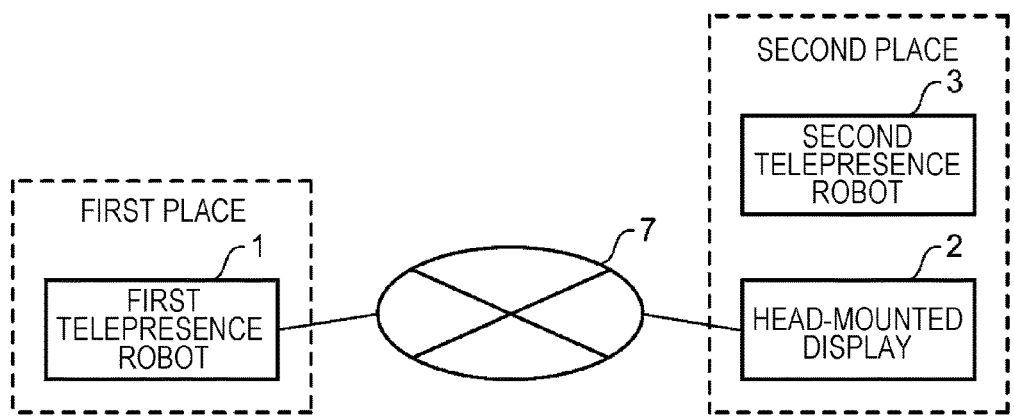
FIG. 1 illustrates a configuration of a remote communication system of a first embodiment of the disclosure.

Underlying Knowledge Forming Basis of the Present Disclosure

Communication performance of robots with humans advance day by day, and telepresence robots that are autonomous robot having teleconference and remote control functionalities have been developed. A telepresence robot that is an avatar of a user as a sender walks around in a remote area, and communicates with a user serving as a communication destination. The telepresence robot thus has a sense of presence more than ever to the user as the communication destination while maintaining good communication. As a result, telepresence robots are beginning to be used in work-from-home business, a variety of events, offices, and educational fields.

According to Japanese Unexamined Patent Application Publication No. 2007-216363, a friend of a person at home and a communication robot visit together a museum, and the person at home views a video captured by the robot on an operation device at home. The communication robot operates in an intermediary mode, for example, turning its head in a direction in which the person on the operation device at home orients, or raising its hand in a direction pointed by a finger of the person at home on the operation device.

According to Japanese Unexamined Patent Application Publication No. 2007-216363, the operation device takes a picture of the person at home, and the communication robot operates in concert with the motion of the person at home.

The operation device disclosed in Japanese Unexamined Patent Application Publication No. 2007-216363 is fixed, and is unable to move in concert with the person who moves together with the communication robot. In the disclosed system, one person and another person at a remote place have difficulty having the feeling of presence as if the partner in communication were present nearby.

According to one aspect of the disclosure, a remote communication method of a remote communication system including a first robot deployed in a first place and a first presentation device deployed in a second place different from the first place, includes capturing, using a camera of the first robot, an image of a first user in the first place, transmitting, using the first robot, the captured image of the first user from the first robot to the first presentation device, receiving, using the first presentation device, the captured image from the first robot, displaying, using the first presentation device, the captured image, detecting, using the first presentation device, a first amount of change indicating a change in a position of a second user in the second place with reference to a second robot that virtually represents the first user, transmitting, using the first presentation device, the first amount of change to the first robot, receiving, using the first robot, the first amount of change from the first presentation device, the first robot moving the first robot to change a point of view of the camera in response to the first amount of change.

The first robot that captures the image of the first user in the first place moves in concert with the movement of the second user in the second place, thus causing the camera of the first robot to change the point of view thereof. The second user has thus the feeling of presence as if the first user in the first place were present in the second place.

The first presentation device may be worn by the second user. The remote communication method may further include:

measuring, using the first presentation device, an initial distance between the second robot and the first presentation device when the second user wearing the first presentation device faces the second robot;

setting, using the first presentation device, a first polar coordinate system having an origin thereof at a position of the second robot, and setting a straight line connecting the position of the second robot to a position of the first presentation device to be a polar axis of the first polar coordinate system;

transmitting, using the first presentation device, the measured initial distance from the first presentation device to the first robot;

receiving, using the first robot, the initial distance from the first presentation device, the first robot moving to a position that is apart from the first user by the initial distance, wherein the position is a position at which the first robot faces to the first user; and setting, using the first robot, a second polar coordinate system having an origin thereof at a position of the first user, and setting a straight line connecting the position of the first robot to the position of the first user to be a polar axis of the second polar coordinate system.

In the first presentation device, the first polar coordinate system having the origin thereof at the position of the second robot is set, and the straight line connecting the second robot to the first presentation device is set to be the polar axis of the first polar coordinate system. In the first robot, the second polar coordinate system having the origin thereof at the position of the first user is set. The straight line connecting the first robot to the first user is set to be the polar axis of the second polar coordinate system. The relative positional relationship of the first presentation device with reference to the second robot may be set to be identical to the relative positional relationship of the first robot with reference to the first user.

The remote communication method may further include:

with the first presentation device moved in position in response to a movement of the second user, measuring, using the first presentation device, a distance between a position of the first presentation device after being moved and the position of the second robot in the first polar coordinate system, and measuring, using the first presentation device, an angle made by a straight line connecting the position of the first presentation device after being moved to the position of the second robot in the first polar coordinate system and the polar axis of the first polar coordinate system, wherein the first amount of change may include the measured distance and the measured angle; and identifying, using the first robot, in the first place a position to which the first robot is to be moved in response to the distance and the angle indicated by the first amount of change.

The first robot may move to the identified position in the moving in response to the first amount of change.

A distance between the identified position and the position of the first user may be equal to the distance indicated by the first amount of change, and an angle made between a straight line connecting the identified position to the position of the first user and the polar axis of the second polar coordinate system may be equal to the angle indicated by the first amount of change.

Based on the distance between the position of the first presentation device after being moved and the position of the second robot in the first polar coordinate system, and the angle made between the straight line connecting the position of the first presentation device after being moved to the position of the second robot and a first polar axis, the first robot is moved such that the relative position of the first presentation device with reference to the second robot in the first polar coordinate system is identical to the relative position of the first robot with reference to the first user in the second polar coordinate system.

The remote communication method may further include determining, using the first presentation device, whether the measured angle is equal to or above a predetermined angle.

The first amount of change may be detected if it is determined that the measured angle is equal to or above the predetermined angle.

If it is determined that the measured angle is equal to or above the predetermined angel, in other words, if an amount of movement of the second user is larger, the first robot may be moved.

The remote communication method may further include, emitting, using the first presentation device, a visible light beam in a downward direction from a front of the second robot.

Since the visible light beam is emitted from the front of the second robot, the second user may face the second robot by viewing the visible light.

The remote communication method may further include, emitting, using the second robot, an infrared light beam from a front of the second robot.

The initial distance may be measured if the infrared light beam, emitted from the second robot, is detected on a front of the first presentation device.

The measurement of the initial distance is thus triggered by the detection of the infrared light beam, emitted from the first robot, on the front of the first presentation device, and the first and second polar coordinate systems may thus be set.

The remote communication method may further include detecting, using the first presentation device, a second amount of change indicating a change in an orientation of the second user's face, receiving, using the first robot, the second amount of change from the first presentation device, and changing, using the first robot, a shooting direction of the camera in response to the second amount of change by rotating the camera.

Since the shooting direction of the camera changes in concert with the change in the orientation of the second user's face, the second user may have the feeling of presence as if the second user were in the first place.

The detecting of the second amount of change may include measuring an angle of rotation in the orientation of the second user's face with reference to the polar axis of the first polar coordinate system, wherein the measured angle of rotation is detected as the second amount of change in the orientation of the second user's face.

In the changing, the camera may rotate until the angle of the shooting direction of the camera with reference to the polar axis of the second polar coordinate system matches the angle indicated by the second amount of change.

Since the shooting direction of the camera changes in concert with the change in the orientation of the second user's face, the second user may have the feeling of presence as if the second user were present in the first place.

The remote communication system may further include a second presentation device deployed in the first place. The second presentation device may be worn by the first user. The remote communication method may further include:

with the first amount of change detected, transmitting, using the first presentation device, to the second presentation device, first notification information prompting the first user to stay still before the first amount of change is transmitted to the first robot;

with the second amount of change detected, transmitting, using the first presentation device, the first notification information to the second presentation device before the second amount of change is transmitted to the first robot, receiving, using the second presentation device, the first notification information from the first presentation device, and displaying, using the second presentation device, the first notification information on the second presentation device.

With the configuration described above, the movement of the first user is controlled when the second user moves.

The first notification information may be displayed if the first notification information is received before the second presentation device detects a third amount of change indicating a change in the position of the first user with reference to the first robot, or the first notification information may be displayed if the first notification information is received before the second presentation device detects a fourth amount of change indicating a change in the orientation of the first user's face with reference to the first robot.

With the configuration described above, the movement of the first user is controlled when the second user moves.

The remote communication system may include a second presentation device deployed in the first place. The second presentation device may be worn by the first user. The remote communication method may further include:

transmitting, using the second presentation device, to the first presentation device, second notification information prompting the second user to stay still, when the second presentation device detects a third amount of change indicating a change in the position of the first user or a fourth amount of change indicating a change in the orientation of the first user's face with reference to the first robot, receiving, using the first presentation device, the second notification information on the first presentation device from the second presentation device, and displaying, using the first presentation device, the second notification information on the first presentation device.

With the configuration described above, the movement of the second user is controlled when the first user moves.

The second notification information may be displayed if the second notification information is received before the first presentation device detects the first amount of change, or the second notification information may be displayed if the second notification information is received before the first presentation device detects the second amount of change.

With the configuration described above, the movement of the second user is controlled when the first user moves.

In another aspect of the disclosure, a remote communication system includes a first robot deployed in a first place, and a presentation device deployed in a second place different from the first place.

The first robot may include a camera that captures an image of a first user in the first place, and a transmitter that transmits the image of the first user captured by the camera to the presentation device.

The presentation device may include a receiver that receives the captured image from the first robot, a display that displays the captured image, a detector that detects a first amount of change in a position of a second user with reference to a second robot that virtually represents the first user, and a transmitter that transmits the first amount of change to the first robot.

The first robot may further include a receiver that receives the first amount of change from the presentation device, a mover that moves the first robot, and a movement controller that controls the mover to change a point of view of the camera in response to the first amount of change.

Since the first robot that captures of the image of the first user in the first place moves and the shooting direction of the camera on the first robot changes in concert with the movement of the second user in the second place, the second user may have the feeling of presence as if the first user in the first place were present in the second place.

In another aspect of the disclosure, an autonomous movement device includes a camera that captures an image of a first user in a first place, a transmitter that transmits the image of the first user captured by the camera to a presentation device deployed in a second place different from the first place, a receiver that receives from the presentation device a first amount of change indicating a change in a position of a second user with reference to a second robot that virtually represents the first user, a mover that moves a first robot, and a movement controller that controls the mover to change a point of view of the camera in response to the first amount of change.

Since the autonomous movement device that captures the image of the first user in the first place moves and the point of view of the camera changes in concert with the movement of the second user in the second place, the second user may have the feeling of presence as if the first user in the first place were present in the second place.

Referring to the drawings, embodiments of the disclosure are described below. The embodiments described below are specific examples of the disclosure, and are not intended to limit the technical scope of the disclosure.

First Embodiment

A remote communication system of a first embodiment of the disclosure is described below.

Figure 2A:
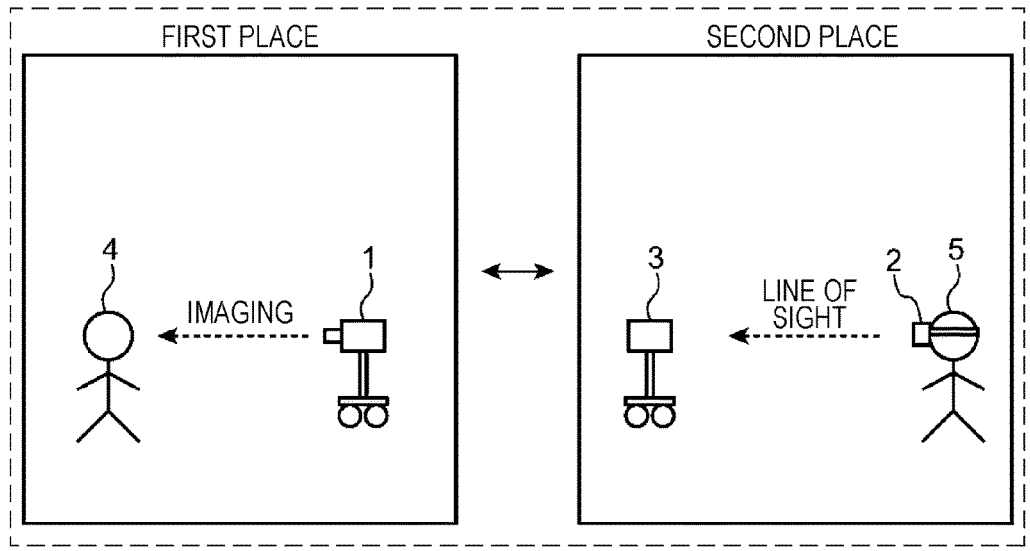
FIG. 2A schematically illustrates the remote communication system of the first embodiment of the disclosure.
Figure 2B:
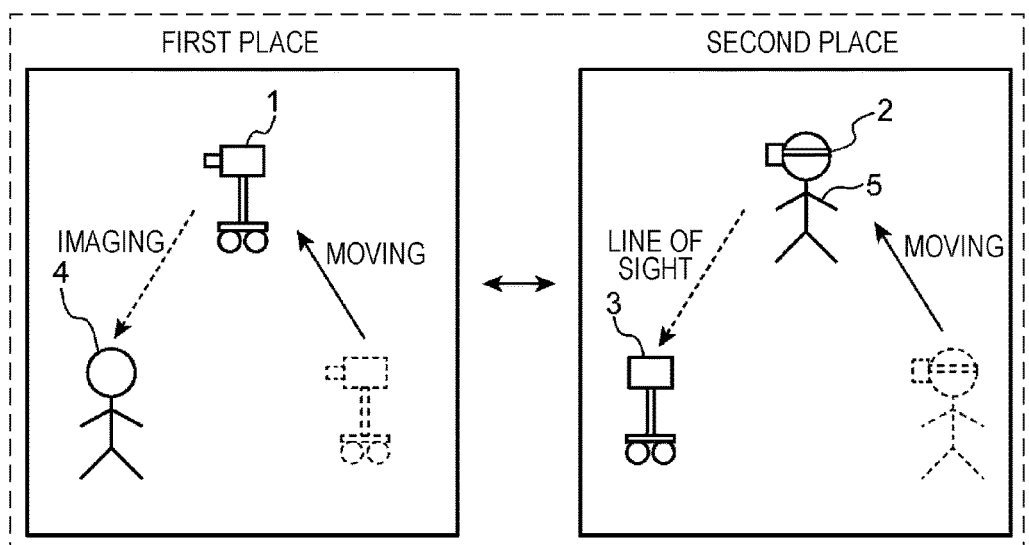
FIG. 2B schematically illustrates the remote communication system of the first embodiment of the disclosure.

FIG. 1 illustrates a configuration of the remote communication system of the first embodiment of the disclosure. FIG. 2A and FIG. 2B schematically illustrate the remote communication system of the first embodiment of the disclosure.

The remote communication system of FIG. 1 includes a first telepresence robot 1, a head-mounted display 2, and a second telepresence robot 3. The first telepresence robot 1 is deployed in a first place, and the head-mounted display 2 and the second telepresence robot 3 are deployed in a second place different from the first place. The first telepresence robot 1 and the head-mounted display 2 communicably connected to each other via a network 7. The network 7 may be the Internet, for example.

As illustrated in FIG. 2A and FIG. 2B, the first telepresence robot 1 in the first place captures an image of a first user 4 as an imaging target, and transmits the captured image of the first user 4 to the head-mounted display 2. The first telepresence robot 1 autonomously moves. The first telepresence robot 1 is also referred to as a movement control device.

The second telepresence robot 3, serving as an avatar for the first user 4, is deployed in the second place. In accordance with the first embodiment, the second telepresence robot 3 may or may not autonomously move.

The head-mounted display 2 is worn on the head of the second user 5. The head-mounted display 2 receives the captured image transmitted from the first telepresence robot 1, and displays the received captured image on a display body (not illustrated) of the head-mounted display 2. The head-mounted display 2 presents the image captured by the first telepresence robot 1 to the second user 5.

When the second user 5 having the head-mounted display 2 moves to a position facing the second telepresence robot 3 as illustrated in FIG. 2A, the head-mounted display 2 measures the distance between the second telepresence robot 3 and the head-mounted display 2. The position facing the second telepresence robot 3 is a position where the second user 5 having the first head-mounted display 2 faces the front of the second telepresence robot 3. The direction in which the second telepresence robot 3 is viewed from the position is a direction in which the front of the second telepresence robot 3 is viewed. The head-mounted display 2 transmits the measured initial distance to the first telepresence robot 1.

The first telepresence robot 1 receives the initial distance from the head-mounted display 2. The shooting direction of the camera of the first telepresence robot 1 is a direction in which the front of the first user 4 is viewed, and the first telepresence robot 1 moves to a position that is apart from the first user 4 by the initial distance. The shooting direction of the camera may be an optical axis of imaging lenses (not illustrated) of the camera. The first telepresence robot 1 may pre-store on a memory (not illustrated) the captured image in which the front of the first user 4 is imaged and may determine, based on the image, whether the shooting direction of the camera is the direction in which the front of the first user 4 is viewed. The first telepresence robot 1 may include a distance sensor (not illustrated), for example, and may determine whether the distance between the first user 4 and the first telepresence robot 1 is the initial distance, using the distance sensor.

Referring to FIG. 2A, the first telepresence robot 1 is apart from the first user 4 by the distance equal to the initial distance between the head-mounted display 2 and the second telepresence robot 3, and the shooting direction of the first telepresence robot 1 is the direction in which the second user 5 views the second telepresence robot 3 that serves as an avatar of the first user 4, namely, the direction of viewing the front of a target. The relative positional relationship of the first telepresence robot 1 with reference to the first user 4 is identical to the relative positional relationship of the head-mounted display 2 with reference to the second telepresence robot 3, which serves as an avatar of the first user 4. Since the head-mounted display 2 is worn by the second user 5, the second user 5 has the same position as that of the head-mounted display 2 in the following discussion.

The second user 5 at the position in FIG. 2A may now move with the head-mounted display 2 worn in the second place. The head-mounted display 2 detects an amount of change in the position of the second user 5 with reference to the position of the second user 5 of FIG. 2A. More specifically, the head-mounted display 2 detects an amount of change in the position of the head-mounted display 2 with reference to the position of the head-mounted display 2 in FIG. 2A. The head-mounted display 2 transmits a first amount of change indicating an amount of change detected to the first telepresence robot 1.

The first telepresence robot 1 receives the first amount of change from the head-mounted display 2, and moves in the first place in response to an amount of change in the position of the second user 5 responsive to the first amount of change. More specifically, as illustrated in FIG. 2B, the direction in which the first telepresence robot 1 after being moved in response to the first amount of change views the first user 4 is equal to the direction in which the second user 5 after being moved views the second telepresence robot 3. Furthermore, the distance between the first telepresence robot 1 after being moved in response to the first amount of change and the first user 4 is equal to the distance between the head-mounted display 2 worn by the second user 5 after being moved and the second telepresence robot 3.

Even if the second user 5 wearing the head-mounted display 2 has moved in the second place, the first telepresence robot 1 moves in response to the first amount of change. The relative positional relationship of the first telepresence robot 1 with reference to the first user 4 is identical to the relative positional relationship of the head-mounted display 2 with reference to the second telepresence robot 3 that serves as an avatar of the first user 4.

The first telepresence robot 1 transmits the captured image of the first user 4 to the head-mounted display 2. In this way, the head-mounted display 2 displays the image of the first user 4 that is captured in the same direction as the direction in which the second user 5 after being moved views the second telepresence robot 3 that serves as an avatar of the first user 4 and at the distance equal to the distance between the second user 5 and the second telepresence robot 3.

In this way, the second user 5 has the feeling of presence as if the first user 4 were present in the second place. In other words, the second user 5 may have the feeling of presence as if the second user 5 were present in the first place.

The head-mounted display 2 may detect an amount of change in facial orientation with reference to the orientation of the face of the second user 5 at the position illustrated in FIG. 2A. In accordance with the first embodiment, the second user 5 may turn his or her head right or left. The head-mounted display 2 detects an amount of change in the orientation of the face of the second user 5, and transmits a second amount of change indicating the amount of change in the facial orientation to the first telepresence robot 1. The first telepresence robot 1 receives the second amount of change from the head-mounted display 2, and changes the shooting direction by turning the camera clockwise or counterclockwise in response to the amount of change in the face of the second user 5 indicated by the second amount of change. In this way, the second user 5 has the feeling of presence as if the first user 4 in the first place were present in the second place.

Figure 3:
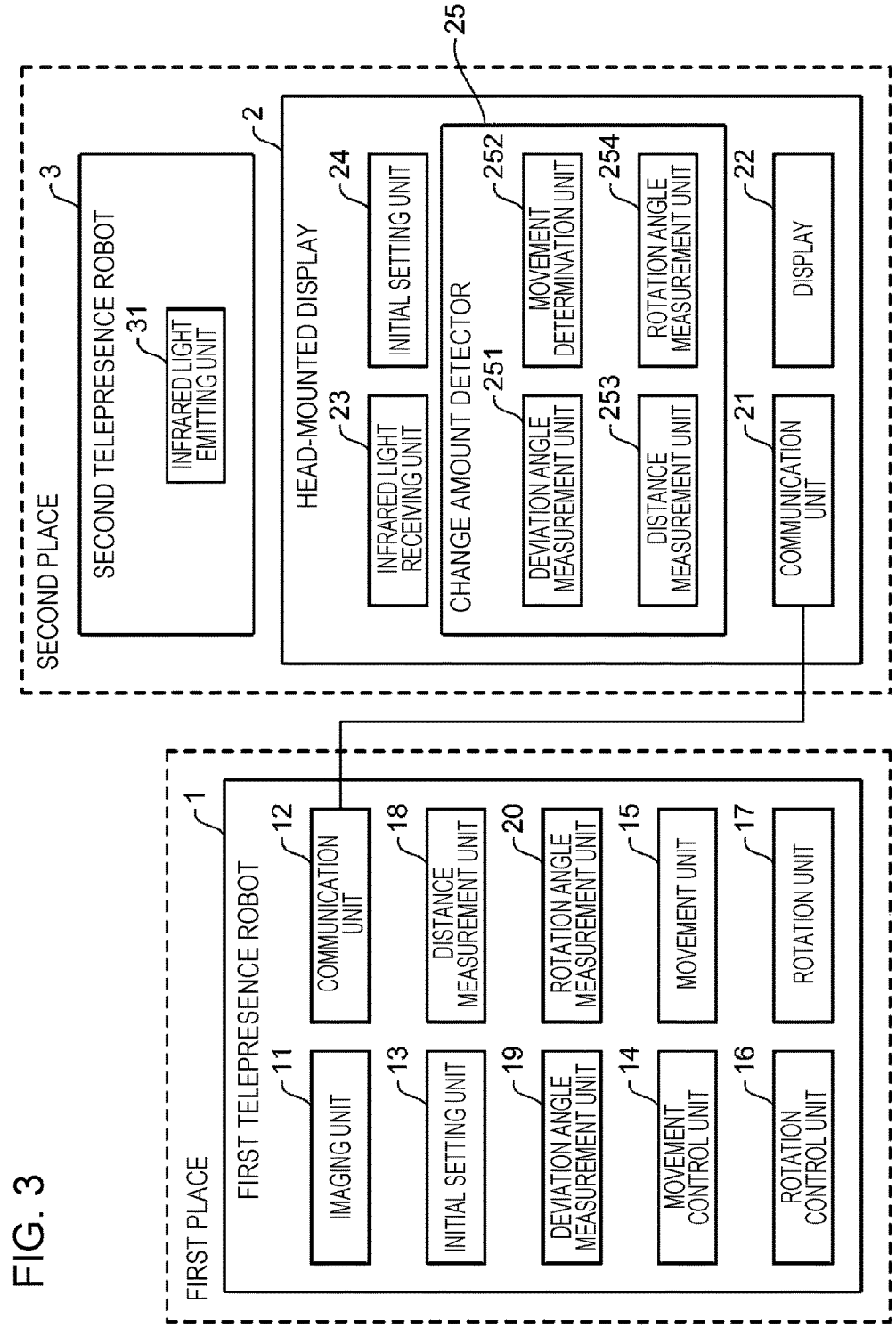
FIG. 3 illustrates a configuration of the first embodiment of the disclosure including a first telepresence robot, a head-mounted display, and a second telepresence robot.

FIG. 3 illustrates a configuration of the first embodiment of the disclosure including the first telepresence robot 1, the head-mounted display 2, and the second telepresence robot 3.

The second telepresence robot 3 includes an infrared light emitting unit 31. The infrared light emitting unit 31 emits infrared light in a forward direction from the front of the second telepresence robot 3. The infrared light may be laser light having an infrared light wavelength. The laser light may also be referred to as infrared laser light.

The head-mounted display 2 includes a communication unit 21, a display 22, an infrared light receiving unit 23, an initial setting unit 24, and a change amount detector 25 corresponding to a detector. The head-mounted display 2 also includes a processor (not illustrated), such as a central processing unit (CPU), and a memory (not illustrated) having stored a program. The processor executes the program, thereby implementing each of the communication unit 21, the display 22, the infrared light receiving unit 23, the initial setting unit 24, and the change amount detector 25.

The communication unit 21 receives the captured image of the first user 4 in the first place from the first telepresence robot 1.

The display 22 includes a display body (not illustrated), and displays the captured image received by the communication unit 21 onto the display body.

The infrared light receiving unit 23 receives and detects the infrared light from the front of the head-mounted display 2. The infrared light receiving unit 23 is mounted at a location that is viewable from the front of the head-mounted display 2. The infrared light is emitted from the front of the second telepresence robot 3. If the infrared light is detected on the front of the head-mounted display 2 worn by the second user 5, the second telepresence robot 3 is placed in front of the head-mounted display 2 and the second user 5 wearing the head-mounted display 2.

In accordance with the first embodiment, the second telepresence robot 3 includes the infrared light emitting unit 31 that emits the infrared light in a forward direction from the front of the second telepresence robot 3. The disclosure is not limited to this arrangement. The second telepresence robot 3 may include a laser light emitting unit that emits visible laser light in a downward direction from the front of the second telepresence robot 3. In such a case, the head-mounted display 2 may not necessarily have to include the infrared light receiving unit 23. The second user 5 may move to a position that faces the second telepresence robot 3 by watching the visible laser light.

The change amount detector 25 detects a first amount of change indicating an amount of change in the position of the second user 5 with reference to the second telepresence robot 3 that is an avatar virtually representing the first user 4. The change amount detector 25 detects a second amount of change indicating a change in the orientation of the face of the second user 5 with reference to the second telepresence robot 3. The communication unit 21 transmits to the first telepresence robot 1 at least one of the first amount of change and the second amount of change, detected by the change amount detector 25. The transmission from the communication unit 21 may be performed by a transmitting unit (not illustrated) of the communication unit 21. The change amount detector 25 may include a deviation angle measurement unit 251, a movement determination unit 252, a distance measurement unit 253, and a rotation angle measurement unit 254.

The distance measurement unit 253 is a measurement sensor, such as light detection and ranging (LIDAR) or a millimeter-wave radar, and measures a distance to a target. The distance measurement unit 253 measures an initial distance between the second telepresence robot 3 and the head-mounted display 2 when the second user 5 faces the second telepresence robot 3. When the infrared light is detected by the infrared light receiving unit 23, the distance measurement unit 253 may measure the initial distance.

If the second telepresence robot 3 emits the visible light laser instead of the infrared light, a button that is to be pressed when the second user 5 faces the second telepresence robot 3 may be mounted on the head-mounted display 2. When the button is pressed, the distance measurement unit 253 may measure the initial distance.

When the second telepresence robot 3 faces the second user 5, in other words, when the infrared light is detected by the infrared light receiving unit 23, the initial setting unit 24 instructs the distance measurement unit 253 to measure the initial distance between the second telepresence robot 3 and the head-mounted display 2. The initial setting unit 24 sets a first polar coordinate system having the origin thereof at the position of the second telepresence robot 3 and sets a straight line connecting the second telepresence robot 3 to the head-mounted display 2 to be a polar axis of the first polar coordinate system. In the following discussion, the polar axis is referred to as a first polar axis. The distance between the second telepresence robot 3 (origin) and the head-mounted display 2 in the first polar axis of the first polar coordinate system is the initial distance measured by the change amount detector 25. The communication unit 21 transmits the initial distance measured by the distance measurement unit 253 to the first telepresence robot 1.

If the second user 5 having the head-mounted display 2 moves after the measurement of the initial distance, the distance measurement unit 253 measures the distance between the head-mounted display 2 after being moved and the second telepresence robot 3 in the first polar coordinate system. This measurement may be performed at regular intervals.

The deviation angle measurement unit 251 measures an angle made between the straight line connecting the head-mounted display 2 after being moved and the position of the second telepresence robot 3 in the first polar coordinate system and the first polar axis.

The deviation angle measurement unit 251 may include an antenna that complies with Bluetooth (registered trademark) Low Energy (BLE) standards. The antenna receives beacon signals transmitted from transmitting units installed around the head-mounted display 2. The transmitting unit is designed to transmit the beacon signal that complies with BLE communication protocol. The transmitting units are installed at fixed intervals (for example, several meters apart from each other) on a ceiling, a floor, or a wall of an inside of a building (such as a room) in the second place, and emit the beacon signals at regular time intervals. Each transmitting unit includes a memory (not illustrated) that pre-stores information indicating an installation position thereof, and transmits the beacon signal including position information thereof. The position information of the transmitting unit is expressed in coordinates of an orthogonal coordinate system representing a specific region in the second place.

The deviation angle measurement unit 251 acquires the position information of the transmitting unit contained in a beacon signal of highest intensity received by the antenna as position information of the head-mounted display 2. The deviation angle measurement unit 251 converts the acquired coordinates of the orthogonal coordinate system into coordinates of the first polar coordinate system. The deviation angle measurement unit 251 measures an angle made between the position of the head-mounted display 2 (the second user 5) after being moved and the position of the second telepresence robot 3 in the first polar coordinate system and the first polar axis. The communication unit 21 sets the distance measured by the distance measurement unit 253 and the angle measured by the deviation angle measurement unit 251 to be an amount of change in the position of the head-mounted display 2, and transmits the first amount of change containing the amount of change to the first telepresence robot 1.

By determining whether the amount of change in the position of the head-mounted display 2 is equal to or above a predetermined value, the movement determination unit 252 determines whether the head-mounted display 2, namely, the second user 5 wearing the head-mounted display 2 has moved. If the movement determination unit 252 determines that the amount of change in the position of the head-mounted display 2 is equal to or above a predetermined value, the change amount detector 25 detects the first amount of change indicating the amount of change. If the movement determination unit 252 determines that the amount of change in the position of the head-mounted display 2 is below the predetermined value, the change amount detector 25 does not detect the first amount of change.

The movement determination unit 252 determines whether the head-mounted display 2 (the second user 5) has moved, by determining whether the angle measured by the deviation angle measurement unit 251 is equal to or above a predetermined angle corresponding to the predetermined amount. Specifically, if the angle measured by the deviation angle measurement unit 251 is equal to or above the predetermined angle, the movement determination unit 252 determines that the head-mounted display 2 (the second user 5) has moved, and the change amount detector 25 detects the first amount of change indicating this amount of change.

On the other hand, if the angle measured by the deviation angle measurement unit 251 is smaller than the predetermined angle, the movement determination unit 252 determines that the head-mounted display 2 (the second user 5) has not moved. The change amount detector 25 does not detect the first amount of change. If the angle measured by the deviation angle measurement unit 251 is equal to or above the predetermined angle, the communication unit 21 transmits the first amount of change to the first telepresence robot 1. If the angle measured by the deviation angle measurement unit 251 is smaller than the predetermined angle, the communication unit 21 does no transmit the first amount of change to the first telepresence robot 1.

The rotation angle measurement unit 254 measures a rotation angle of the farce of the second user 5 with reference to the first polar axis of the first polar coordinate system. The angle of the face of the second user 5 is also referred to as the rotation angle. The rotation angle measurement unit 254 includes an inertial sensor, for example. The inertial sensor includes a three-axis angular velocity sensor and a three-directional acceleration sensor, and detects inertia, and thus detects a motion of the head of the second user 5. The rotation angle measurement unit 254 stores on a memory (not illustrated) a first reference direction that is a direction from the position of the head-mounted display 2 in the first polar axis to the origin of the first polar coordinate system (the position of the second telepresence robot 3) when the first polar coordinate system is set up. The rotation angle measurement unit 254 measures as the rotation angle an orientation of the face of the second user 5 with reference to the first reference direction. The communication unit 21 sets the rotation angle measured by the rotation angle measurement unit 254 to be an amount of change in the orientation of the face of the second user 5 and transmits the second amount of change indicating this amount of change to the first telepresence robot 1.

The first telepresence robot 1 includes an imaging unit 11, a communication unit 12, an initial setting unit 13, a movement control unit 14, a movement unit 15, a rotation control unit 16, a rotation unit 17, a distance measurement unit 18, a deviation angle measurement unit 19, and a rotation angle measurement unit 20. The first telepresence robot 1 includes a processor (not illustrated), and a memory (not illustrated) that stores a program. By executing the program, the processor implements the imaging unit 11, the communication unit 12, the initial setting unit 13, the movement control unit 14, the movement unit 15, the rotation control unit 16, the rotation unit 17, the distance measurement unit 18, the deviation angle measurement unit 19, and the rotation angle measurement unit 20.

The imaging unit 11 captures the image of the first user 4. The imaging unit 11 may be a camera, for example.

The communication unit 12 transmits the image captured by the imaging unit 11 to the head-mounted display 2. Also, the communication unit 12 receives at least one of the first amount of change and the second amount of change, transmitted from the head-mounted display 2. The communication unit 12 also receives the initial distance from the head-mounted display 2 at an initial setting time.

The distance measurement unit 18 is a distance sensor, and measures a distance to a target. The target may be the first user 4, for example. The distance measurement unit 18 measures the distance between the first telepresence robot 1 and the first user 4.

By controlling the movement unit 15, the movement control unit 14 moves the first telepresence robot 1.

The movement unit 15 includes a motor and driving wheels, and moves the first telepresence robot 1. When the first amount of change is received, the movement control unit 14 controls the movement unit 15 and moves the first telepresence robot 1 to the position responsive to the first amount of change. In response to the movement, the shooting location changes, and the point of view of the imaging unit 11 also changes. The image of the first user 4 captured by the imaging unit 11 also changes. When the communication unit 12 receives the initial distance, the movement control unit 14 controls the movement unit 15 to move the first telepresence robot 1 to a position apart from the first user 4 by the initial distance with the first telepresence robot 1 facing the first user 4.

The initial setting unit 13 sets the second polar coordinate system having the origin at the position of the first user 4, and sets a straight line connecting the position of the first telepresence robot 1 to the position of the first user 4 to be the polar axis of the second polar coordinate system. In the discussion that follows, the polar axis is referred to as a second polar axis. The initial setting unit 13 stores on a memory (not illustrated) the position of the first telepresence robot 1 and the position of the first user 4 in the second polar coordinate system.

If the first telepresence robot 1 has moved, the distance measurement unit 18 measures an angle made between a straight line connecting the position of the first telepresence robot 1 to the position of the first user 4 and the second polar axis.

The deviation angle measurement unit 19 includes an antenna that complies with BLE standards. The antenna receives beacon signals transmitted from transmitting units arranged around the first telepresence robot 1. The transmitting units are installed at fixed intervals (for example, several meters apart from each other) on a ceiling, a floor, or a wall of an inside of a building (such as a room) in the first place, and emit the beacon signals at regular time intervals. Each transmitting unit includes a memory (not illustrated) that pre-stores information indicating an installation position thereof, and transmits the beacon signal including position information thereof. The position information of the transmitting unit is expressed in coordinates of an orthogonal coordinate system representing a specific region in the first place.

The deviation angle measurement unit 19 acquires the position information of the transmitting unit contained in a beacon signal of highest intensity received by the antenna as position information of the first telepresence robot 1. The deviation angle measurement unit 19 converts the acquired coordinates of the orthogonal coordinate system into coordinates of the second polar coordinate system. The deviation angle measurement unit 19 measures an angle made between a straight line connecting the position of the first telepresence robot 1 after being moved and the position of the first user 4 in the first polar coordinate system and the second polar axis.

The movement control unit 14 controls the movement unit 15 to move the first telepresence robot 1 in response to the distance and angle contained in the received first amount of change such that the relative position of the second user 5 with reference to the second telepresence robot 3 in the first polar coordinate system is equal to the relative position of the first telepresence robot 1 with reference to the first user 4 in the second polar coordinate system. The position to which the first telepresence robot 1 is moved in response to the first amount of change is the position where an angle made between a straight line connecting the position to the position of the first user 4 and the second polar axis is equal to the angle indicated by the first amount of change and the distance between the position and the position of the first user 4 is equal to the distance indicated by the first amount of change.

The rotation control unit 16 rotates the first telepresence robot 1 by controlling the rotation unit 17.

The rotation angle measurement unit 20 measures a rotation angle of the shooting direction of the imaging unit 11 in the first telepresence robot 1 with reference to the second polar axis of the second polar coordinate system. The angle of the shooting direction is also referred to as a rotation angle of the shooting direction. The shooting direction of the imaging unit 11 indicates an optical axis of imaging lenses (not illustrated) of the camera corresponding to the imaging unit 11. The rotation angle measurement unit 20 may include an inertial sensor, for example. The inertial sensor includes a three-axis angular velocity sensor and a three-directional acceleration sensor, and detects inertia, and thus detects the shooting direction of the camera corresponding to the imaging unit 11 in the first telepresence robot 1. The rotation angle measurement unit 20 stores on a memory (not illustrated) a second reference direction that is a direction from the position of the first telepresence robot 1 in the first polar axis to the position of the first user 4 in the second polar coordinate system when the second polar coordinate system is set up. The rotation angle measurement unit 20 measures as the rotation angle the angle of the shooting direction of the first telepresence robot 1 with reference to the second reference direction.

The rotation unit 17 rotates the first telepresence robot 1 about a rotation axis (not illustrated). The direction of the rotation axis may be vertical to a floor surface on which the first telepresence robot 1 is deployed. In this way, the first telepresence robot 1 rotates about the rotation axis. By rotating the first telepresence robot 1, the rotation unit 17 rotates the camera corresponding to the imaging unit 11 in the first telepresence robot 1. In this way, the shooting direction of the imaging unit 11 changes. The shooting direction of the imaging unit 11 indicates the direction of the optical axis of the imaging lenses of the camera corresponding to the imaging unit 11.

When the second amount of change is received, the rotation control unit 16 controls the rotation unit 17, thereby rotating the first telepresence robot 1 in response to the second amount of change. The shooting direction of the imaging unit 11 thus changes. In other words, the rotation control unit 16 controls the rotation unit 17, thereby rotating the first telepresence robot 1 in response to the rotation angle contained in the received second amount of change. The rotation control unit 16 causes the rotation unit 17 to change the shooting direction of the imaging unit 11 with reference to the second polar axis until the rotation angle measured by the rotation angle measurement unit 20 matches the rotation angle indicated by the received second amount of change. In the above example, the rotation unit 17 rotates the first telepresence robot 1. The disclosure is not limited to this method. For example, the rotation unit 17 may rotate only the camera as the imaging unit 11 about the axis of rotation (not illustrated).

The first telepresence robot 1 may include a microphone that picks up the voice of the first user 4, and the head-mounted display 2 may include a speaker that outputs a voice corresponding to audio data received by the communication unit 21. In such a case, the microphone in the first telepresence robot 1 picks up the voice of the first user 4 and converts the voice into the audio data. The communication unit 12 transmits the audio data picked up by the microphone to the head-mounted display 2. The communication unit 21 in the head-mounted display 2 receives the audio data transmitted from the first telepresence robot 1. The speaker outputs the voice of the first user 4 responsive to the received audio data.

In accordance with the first embodiment, the first telepresence robot 1 corresponds to a first robot. The first telepresence robot 1 is also referred to as an autonomous movement device. The head-mounted display 2 corresponds to a first presentation device. The second telepresence robot 3 corresponds to a second robot.

The communication unit 12 in the first telepresence robot 1 may include a transmitting unit (not illustrated) and a receiving unit (not illustrated). The transmitting unit may include a transmitting circuit. The receiving unit may include a receiving circuit. The transmission process of the communication unit 12 may be performed by the transmitting unit. The reception process of the communication unit 12 may be performed by the receiving unit.

The communication unit 21 in the head-mounted display 2 may include a transmitting unit (not illustrated) and a receiving unit (not illustrated). The transmitting unit may include a transmitting circuit. The receiving unit may include a receiving circuit. The transmission process of the communication unit 21 may be performed by the transmitting unit. The reception process of the communication unit 21 may be performed by the receiving unit.

An initial setting process is described below. In the initial setting process, the head-mounted display 2 and the first telepresence robot 1 set the first polar coordinate system and the second polar coordinate system, respectively.

Figure 4:
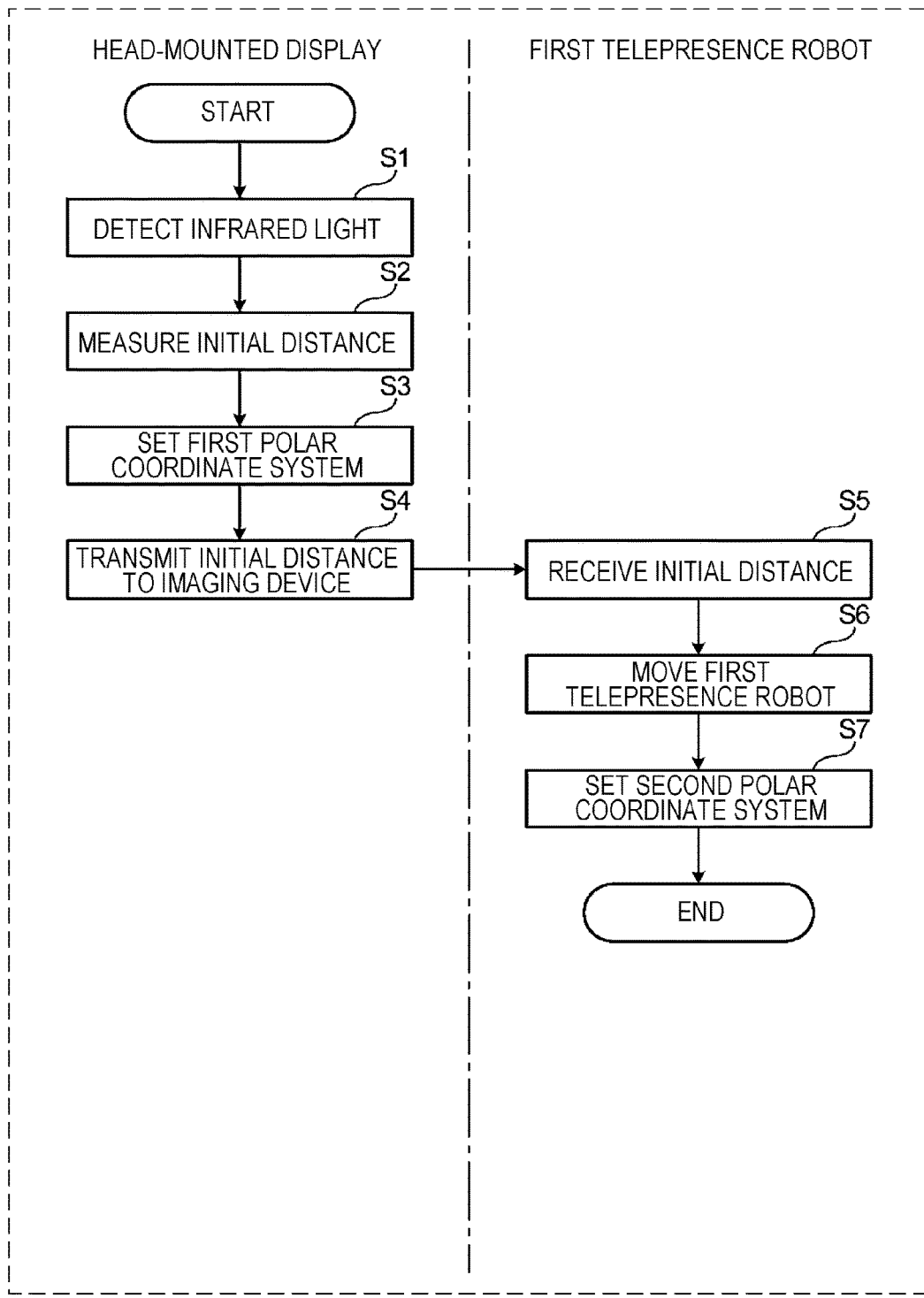
FIG. 4 is a flowchart illustrating an initial setting process of the first embodiment of the disclosure in which the head-mounted display and the first telepresence robot set a first polar coordinate system and a second polar coordinate system.

FIG. 4 is a flowchart illustrating an initial setting process of the first embodiment of the disclosure in which the head-mounted display 2 and the first telepresence robot 1 set the first polar coordinate system and the second polar coordinate system, respectively.

In step S1, the infrared light receiving unit 23 in the head-mounted display 2 detects infrared light emitted from the second telepresence robot 3 when the second user 5 wearing the head-mounted display 2 faces the second telepresence robot 3.

In step S2, the distance measurement unit 253 measures the initial distance between the second telepresence robot 3 and the head-mounted display 2 when the second telepresence robot 3 faces the second user 5.

In step S3, the initial setting unit 24 sets up the first polar coordinate system having the origin thereof at the position of the second telepresence robot 3 and sets the straight line connecting the position of the second telepresence robot 3 to the position of the head-mounted display 2 to be the polar axis of the first polar coordinate system, namely, the first polar axis. The initial set value of the first polar coordinate system is stored on the memory (not illustrated) in the head-mounted display 2.

In step S4, the communication unit 21 transmits the initial distance measured by the distance measurement unit 253 to the first telepresence robot 1.

In step S5, the communication unit 12 in the first telepresence robot 1 receives the initial distance transmitted from the head-mounted display 2.

In step S6, the movement control unit 14 controls the movement unit 15 to cause the first telepresence robot 1 to face the first user 4 while moving the first telepresence robot 1 to the position apart by the initial distance from the first user 4.

For example, the movement control unit 14 moves the first telepresence robot 1 to a position facing the first user 4 in accordance with the image of the first user 4 captured by the imaging unit 11. More specifically, the movement control unit 14 controls the movement unit 15, thereby moving the first telepresence robot 1 to the position where the image of the front of the first user 4 is captured. In this way, the first telepresence robot 1 is moved to the position facing the first user 4.

The distance measurement unit 18 measures the distance between the first telepresence robot 1 and the first user 4, and the movement control unit 14 controls the movement unit 15, thereby moving the first telepresence robot 1 such that the distance between the first telepresence robot 1 and the first user 4 is the initial distance.

Alternatively, the movement control unit 14 may control the movement unit 15 to move the first telepresence robot 1 to the position that is apart from the first user 4 by the initial distance. The movement control unit 14 then controls the movement unit 15 to move the first telepresence robot 1 at the position facing the first user 4 in accordance with the image captured by moving the first telepresence robot 1 along a circle having the initial distance as the radius thereof and centered on the first user 4.

In step S7, the initial setting unit 13 sets the second polar coordinate system having the origin at the position of the first user 4 and sets the straight line connecting the position of the first telepresence robot 1 to the position of the first user 4 to be the polar axis of the second polar coordinate system, namely, the second polar axis. The initial set value of the second polar coordinate system is stored on the memory (not illustrated) in the first telepresence robot 1.

Figure 5:
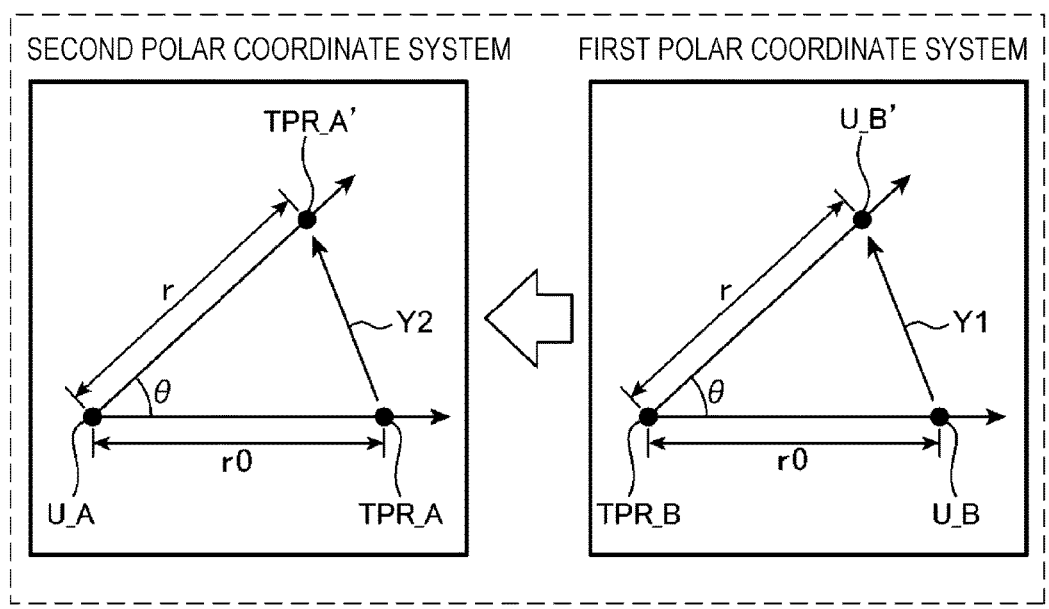
FIG. 5 schematically illustrates an initial setting in each of the first and second polar coordinate systems of the first embodiment of the disclosure.

FIG. 5 schematically illustrates the setting of the first polar coordinate system by the initial setting unit 24 and the setting of the second polar coordinate system by the initial setting unit 13 in accordance with the first embodiment of the disclosure.

Referring to FIG. 5, the first polar coordinate system has the origin at a position TPR_B of the second telepresence robot 3 and the first polar axis that is a straight line connecting the position TPR_B of the second telepresence robot 3 to a position U_B of the head-mounted display 2. In the first polar coordinate system, the distance between the position TPR_B of the second telepresence robot 3 and the position U_B of the head-mounted display 2 is an initial distance r0.

The second polar coordinate system has the origin at a position TPR_A of the first user 4 and the second polar axis that is a straight line connecting the position TPR_A of the first telepresence robot 1 to a position U_A of the first user 4. In the second polar coordinate system, the distance between the position TPR_A of the first telepresence robot 1 and the position U_A of the first user 4 is the initial distance r0.

The second user 5 having the head-mounted display 2 may now move in the second place. For example, when the position U_B of the head-mounted display 2 shifts in a direction of an arrow Y1 in the first polar coordinate system, the distance measurement unit 253 measures the distance r between a position U-B' of the head-mounted display 2 after being moved and the position TPR_B of the second telepresence robot 3, and the deviation angle measurement unit 251 measures an angle θ made between the straight line connecting the position U-B' of the head-mounted display 2 after being moved to the position TPR_B of the second telepresence robot 3 and the first polar axis.

The communication unit 21 sets the measured distance r and the angle θ to be an amount of change in the position of the second user 5, and transmits the first amount of change indicating the amount of change to the first telepresence robot 1. The amount of change in the position of the second user 5 is the amount of change in the position of the head-mounted display 2 worn by the second user 5 as well.

When the communication unit 12 receives the first amount of change from the head-mounted display 2, the movement control unit 14 calculates a position TPR_A' to which the first telepresence robot 1 is to be moved in response to the first amount of change. In the second polar coordinate system, the position TPR_A' is defined by the distance between the position TPR_A' and the position U_A of the first user 4, namely, the distance r indicated by the first amount of change and is defined by the angle θ made between the straight line from the position TPR_A' to the position U_A and the second polar axis. The movement control unit 14 controls the movement unit 15, thereby moving the first telepresence robot 1 from the position TPR_A to the position TPR_A'. In such a case, the first telepresence robot 1 moves in a direction labeled an arrow Y2.

The rotation angle measurement unit 254 measures as the rotation angle the orientation of the face of the second user 5 with reference to the first reference direction. The first reference direction is the direction from the position U_B to the position TPR_B in the first polar coordinate system. The communication unit 21 sets the rotation angle measured by the rotation angle measurement unit 254 to be an amount of change in the orientation of the face of the second user 5, and transmits the second amount of change indicating this amount of change to the first telepresence robot 1.

When the communication unit 12 receives the second amount of change from the head-mounted display 2, the rotation control unit 16 controls the rotation unit 17, thereby rotating the first telepresence robot 1. For example, with the direction from the position TPR_A to the position U_A set to be a second reference direction in FIG. 5, the rotation control unit 16 controls the rotation unit 17, thereby rotating the first telepresence robot 1 such that the angle of the shooting direction of the first telepresence robot 1 with reference to the second reference direction is equal to the rotation angle indicated by the second amount of change.

The process of the remote communication system of the first embodiment of the disclosure is described below.

Figure 6:
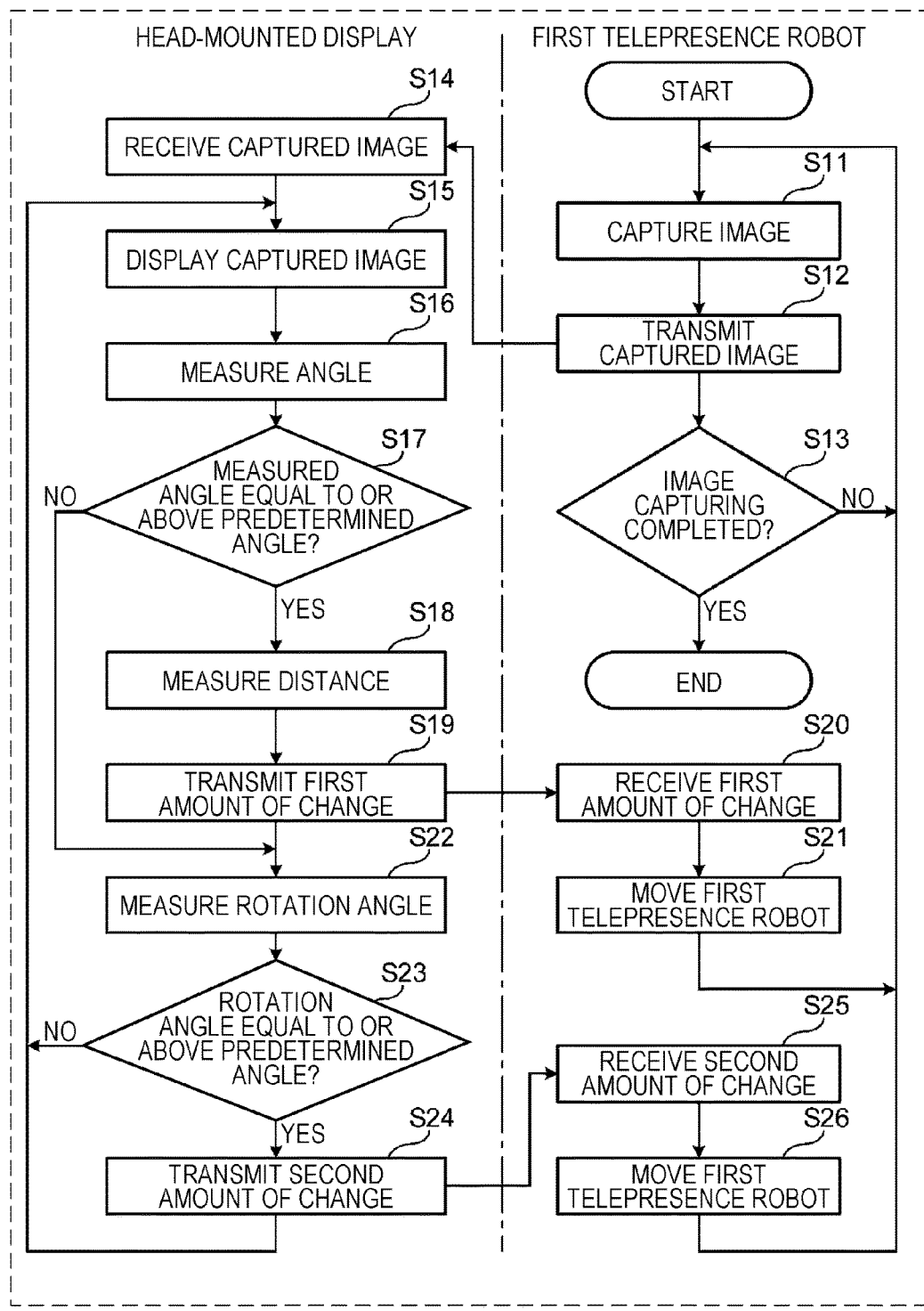
FIG. 6 is a flowchart illustrating a process of the remote communication system of the first embodiment of the disclosure.

FIG. 6 is a flowchart illustrating the process of the remote communication system of the first embodiment of the disclosure. The process illustrated in the flowchart of FIG. 6 may be performed subsequent to the end of the process illustrated in the flowchart of FIG. 4.

In step S11, the imaging unit 11 in the first telepresence robot 1 captures the image of the first user 4.

In step S12, the communication unit 12 transmits the image captured by the imaging unit 11 to the head-mounted display 2.

In step S13, the imaging unit 11 determines whether to end imaging. If the imaging is to end (yes branch from step S13), the process of the remote communication system is complete. If the imaging is not to end (no branch from step S13), processing returns to step S11, and the imaging unit 11 continues to image the first user 4. For example, the first telepresence robot 1 receives an input from the first user 4 as to whether to end imaging. The imaging unit 11 may determine whether to end imaging based on the input. Alternatively, the head-mounted display 2 may receive from the second user 5 as to whether to end imaging. In such a case, the communication unit 21 transmits information indicating whether to end imaging to the first telepresence robot 1.

In step S14, the communication unit 21 in the head-mounted display 2 receives the captured image from the first telepresence robot 1.

In step S15, the display 22 displays the captured image received by the communication unit 21.

In step S16, the deviation angle measurement unit 251 measures the angle made between the straight line connecting the position of the head-mounted display 2 to the position of the second telepresence robot 3 in the first polar coordinate system and the first polar axis.

In step S17, the deviation angle measurement unit 251 determines whether the measured angle is equal to or above the predetermined angle. If the deviation angle measurement unit 251 determines that the measured angle is smaller than the predetermined angle (no branch from step S17), processing proceeds to step S22.

If the deviation angle measurement unit 251 determines that the measured angle is equal to or above the predetermined angle (yes branch from step S17), the distance measurement unit 253 measures the distance between the position of the head-mounted display 2 and the position of the second telepresence robot 3 in the first polar coordinate system in step S18.

In step S19, the communication unit 21 sets the angle measured by the deviation angle measurement unit 251 and the distance measured by the distance measurement unit 253 to be an amount of change in the position of the second user 5, and transmits the first amount of change indicating the amount of change in the position of the second user 5 to the first telepresence robot 1.

In step S20, the communication unit 12 in the first telepresence robot 1 receives the first amount of change from the head-mounted display 2.

In step S21, in response to the distance and angle contained in the first amount of change received by the communication unit 12, the movement unit 15 moves the first telepresence robot 1 such that the relative position of the second user 5 with reference to the second telepresence robot 3 in the first polar coordinate system is equal to the relative position of the first telepresence robot 1 with reference to the first user 4 in the second polar coordinate system.

Processing returns to step S11, and the imaging unit 11 captures the image of the first user 4.

After the first amount of change is transmitted in step S19, the rotation angle measurement unit 254 measures as the rotation angle the orientation of the face of the second user 5 with reference to the first polar axis of the first polar coordinate system in step S22.

In step S23, the rotation angle measurement unit 254 determines whether the measured rotation angle is equal to or above the predetermined angle. If the rotation angle measurement unit 254 determines that the measured rotation angle is smaller than the predetermined angle (no branch from step S23), processing returns to step S15.

If the rotation angle measurement unit 254 determines that the measured rotation angle is equal to or above the predetermined angle (yes branch from step S23), the communication unit 21 transmits to the first telepresence robot 1 the second amount of change including an amount of change in the orientation of the face of the second user 5 in step S24. The amount of change in the orientation of the face of the second user 5 is the rotation angle measured by the rotation angle measurement unit 254. Processing returns to step S15, and the display 22 displays the captured image received by the communication unit 21.

In step S25, the communication unit 12 in the first telepresence robot 1 receives the second amount of change from the head-mounted display 2.

In step S26, the rotation control unit 16 controls the rotation unit 17, thereby rotating the first telepresence robot 1 in response to the second amount of change. More specifically, the rotation control unit 16 controls the rotation unit 17 to rotate the first telepresence robot 1 until the rotation angle measured by the rotation angle measurement unit 20 matches the rotation angle indicated by the second amount of change. The shooting direction of the imaging unit 11 changes by rotating the first telepresence robot 1. In this way, the shooting direction of the imaging unit 11 may change in response to the amount of change in the orientation of the face of the second user 5, namely, the amount of change in the direction of line of sight of the second user 5. Processing returns to step S11 and the first telepresence robot 1 captures the image of the first user 4.

In the remote communication system of the first embodiment, the first telepresence robot 1 captures the image of the first user 4 in the first place, and the head-mounted display 2 presents the captured image to the second user 5. This process is specifically described below.

Figure 7:
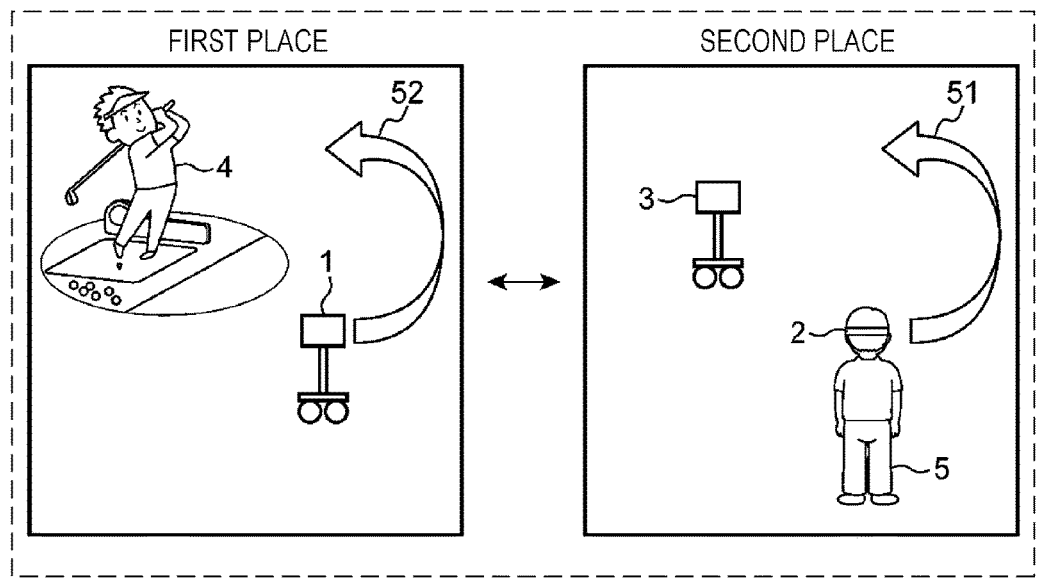
FIG. 7 illustrates a process of the remote communication system of the first embodiment of the disclosure in which the first telepresence robot captures the image of the front of a first user in a first place.

FIG. 7 illustrates a process of the remote communication system of the first embodiment of the disclosure in which the first telepresence robot captures the image of the front of the first user in the first place.

FIG. 7 illustrates the state of the remote communication system immediately after the end of the process illustrated in the flowchart of FIG. 4. In other words, the setting of the first polar coordinate system by the head-mounted display 2 and the setting of the second polar coordinate system by the first telepresence robot 1 are complete. In the second place of FIG. 7, the head-mounted display 2 worn by the second user 5 is at the position U_B of the first polar coordinate system of FIG. 5. The second telepresence robot 3 is at the position TPR_B in the first polar coordinate system of FIG. 5. In the first place of FIG. 7, the position of the first telepresence robot 1 may be the position TPR_A in the second polar coordinate system of FIG. 5, for example. The position of the first user 4 is the position U_A in the second polar coordinate system of FIG. 5.

In the first place of FIG. 7, the first telepresence robot 1 captures the image of the first user 4, and transmits the captured image to the head-mounted display 2. The first user 4 is swinging a golf club, and the first telepresence robot 1 is capturing the image of the front of the first user 4. The captured image of the front of the first user 4 swinging the golf club is displayed on the head-mounted display 2 worn by the second user 5.

In the second place, the head-mounted display 2 moves around behind the second telepresence robot 3 along an arrow 51. The first telepresence robot 1 in the first place moves around behind the first user 4 along an arrow 52. In the second place, the position of the second user 5 after being moved is the position U_B' in the first polar coordinate system of FIG. 5. In the first place, the position of the first telepresence robot 1 after being moved is the position TPR_A' in the second polar coordinate system of FIG. 5.

Figure 8:
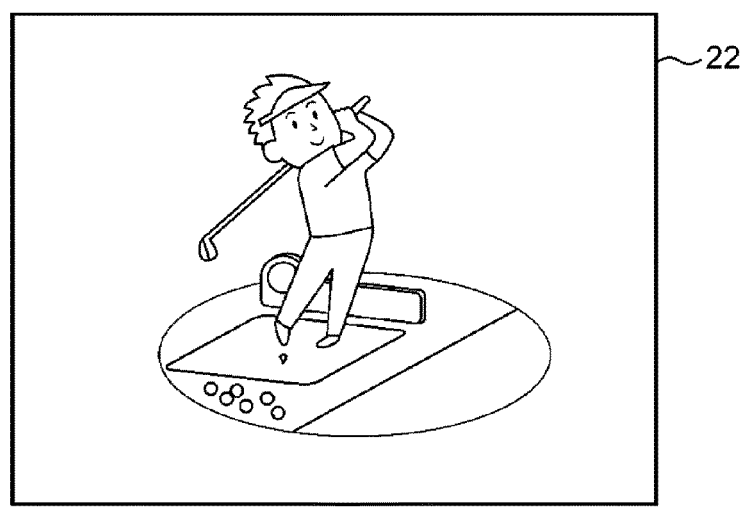
FIG. 8 illustrates an example of a display screen presented on a head-mounted display in a second place of FIG. 7.

FIG. 8 illustrates an example of a display screen presented on the head-mounted display 2 in the second place of FIG. 7.

Referring to FIG. 8, the display 22 in the head-mounted display 2 displays the image of the front of the first user 4 captured in the first place.

Figure 9:
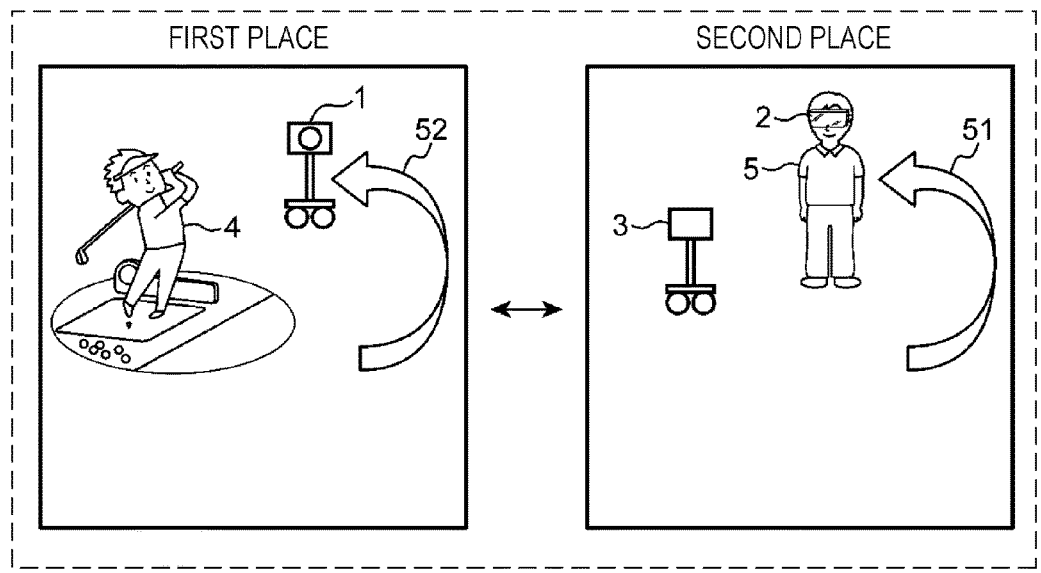
FIG. 9 illustrates a process of the remote communication system of the first embodiment of the disclosure in which the first telepresence robot captures of an image of the back of the first user in the first place.

FIG. 9 illustrates a process of the remote communication system of the first embodiment in which the first telepresence robot 1 captures the image of the back of the first user in the first place.

In the second place of FIG. 9, the second user 5 has moved in the direction labeled an arrow 51 and is now behind the second telepresence robot 3. The first telepresence robot 1 in the first place moves along an arrow 52 in concert with the movement of the second user 5, and is now behind the first user 4.

The first telepresence robot 1 captures the image of the first user 4, and then transmits the captured image to the head-mounted display 2. The first telepresence robot 1 may now capture the image of the back of the first user 4 who is now swinging the golf club.

Figure 10:
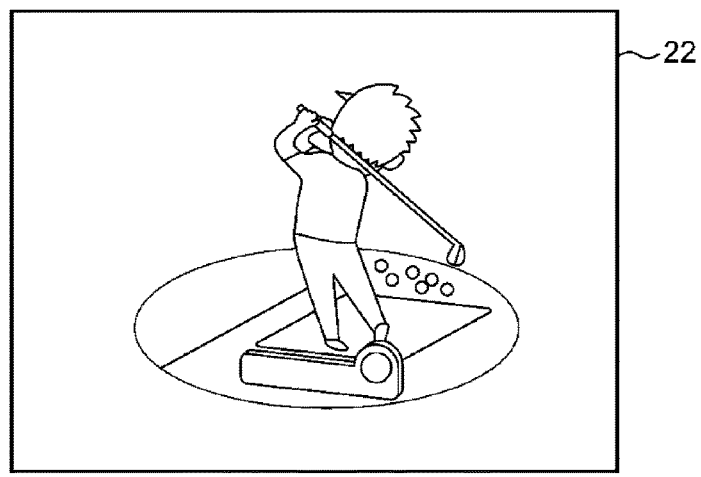
FIG. 10 illustrates an example of a display screen presented on a head-mounted display in the second place of FIG. 9.

FIG. 10 illustrates an example of a display screen presented on a head-mounted display 2 in the second place of FIG. 9.

Referring to FIG. 10, the display 22 in the head-mounted display 2 displays the captured image of the back of the first user 4 in the first place.

The first telepresence robot 1 moves in the first place in concert with the movement of the second user 5 wearing the head-mounted display 2 in the second place. The point of view of the imaging unit 11 in the first telepresence robot 1 also moves in concert with the movement of the first telepresence robot 1. As a result, the captured image displayed on the head-mounted display 2 changes in concert with the movement of the second user 5. As a result, the second user 5 has the feeling of presence as if the first user 4 in the first place were present in the second place.

In accordance with the first embodiment, the captured image may continue to be displayed while the second user 5 is moving. Alternatively, the captured image may not be displayed while the second user 5 is moving, but may be displayed when the second user 5 stops moving. In this way, blurriness caused in the captured image as a result of the movement of the first telepresence robot 1 is controlled.

In accordance with the first embodiment, changes in the positions of the second user 5 and the first telepresence robot 1 on two-dimensional surfaces are detected. Alternatively, changes of the second user 5 and the first telepresence robot 1 in three-dimensional spaces may be detected. In such a case, the head-mounted display 2 may detect the movement of the head-mounted display 2 in the three-dimensional space, and the first telepresence robot 1 may move in concert with the movement of the head-mounted display 2 in the three-dimensional space.

Second Embodiment

A remote communication system of a second embodiment of the disclosure is described below. In accordance with the first embodiment, the first telepresence robot 1 is deployed in the first place while the head-mounted display 2 and the second telepresence robot 3 are deployed in the second place. In accordance with the second embodiment, a first telepresence robot and a first head-mounted display are deployed in the first place while a second head-mounted display and a second telepresence robot are deployed in the second place.

Figure 11:
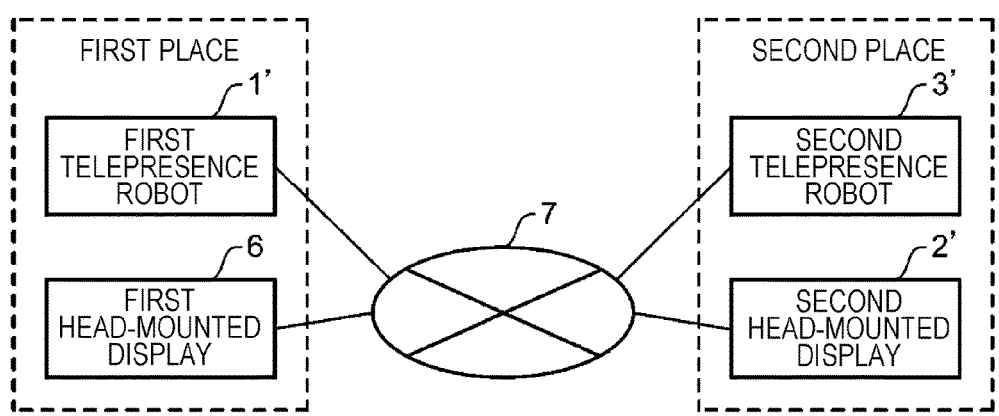
FIG. 11 illustrates a configuration of a remote communication system of a second embodiment of the disclosure.

FIG. 11 illustrates the configuration of the remote communication system of the second embodiment of the disclosure.

The remote communication system of FIG. 11 includes a first telepresence robot 1', a first head-mounted display 6, a second head-mounted display 2', and a second telepresence robot 3'. The first telepresence robot 1' and the first head-mounted display 6 are deployed in the first place while the second head-mounted display 2' and the second telepresence robot 3' are deployed in the second place different from the first place.

The first telepresence robot 1' is communicably connected to the second head-mounted display 2' via the network 7. The second telepresence robot 3' is communicably connected to the first head-mounted display 6 via the network 7. The first head-mounted display 6 is communicably connected to the second head-mounted display 2'. The network 7 is the Internet, for example.

The first telepresence robot 1' captures the image of the first user 4 in the first place, and transmits the captured image to the second head-mounted display 2'. The first telepresence robot 1' autonomously moves.

The second head-mounted display 2' is worn on the head of the second user 5. The second head-mounted display 2' receives the captured image transmitted from the first telepresence robot 1' and displays the received image. Namely, the second head-mounted display 2' presents the captured image received from the first telepresence robot 1' to the second user 5 wearing the second head-mounted display 2'. The positional relationship between the first telepresence robot 1' and the first head-mounted display 6 worn by the first user 4 is identical to the positional relationship between the second telepresence robot 3' and the second head-mounted display 2' worn by the second user 5.

When the second user 5 moves in the second place, the first telepresence robot 1' also moves in concert with the second user 5. Accordingly, the relative positional relationship of the first telepresence robot 1 with reference to the first head-mounted display 6 worn by the first user 4 is identical to the relative positional relationship of the second head-mounted display 2' with reference to the second telepresence robot 3' that serves as an avatar of the first user 4. The first telepresence robot 1' transmits to the second head-mounted display 2' the image of the first user 4. In this way, the second head-mounted display 2' displays the image of the first user 4 that is captured in the same direction as the direction in which the second user 5 after being moved views the second telepresence robot 3' that serves as an avatar of the first user 4 and at the distance equal to the distance between the second user 5 and the second telepresence robot 3'.

The second telepresence robot 3' captures the image of the second user 5 in the second place, and transmits the captured image to the first head-mounted display 6. The second telepresence robot 3' autonomously moves. The first head-mounted display 6 is worn on the head of the first user 4. The first head-mounted display 6 receives the captured image transmitted from the second telepresence robot 3', and displays the received image. The first head-mounted display 6 presents the image captured by the second telepresence robot 3' to the first user 4 in the first place. The positional relationship between the second telepresence robot 3' and the second head-mounted display 2' worn by the second user 5 is identical to the positional relationship between the first telepresence robot 1' and the first head-mounted display 6 worn by the first user 4.

When the first user 4 moves in the first place, the second telepresence robot 3' also moves in concert with the first user 4. Accordingly, the relative positional relationship of the second telepresence robot 3' with reference to the second head-mounted display 2' worn by the second user 5 is identical to the relative positional relationship of the first head-mounted display 6 with reference to the first telepresence robot 1' that serves as an avatar of the second user 5. The second telepresence robot 3' transmits to the first head-mounted display 6 the image of the second user 5. In this way, the first head-mounted display 6 displays the image of the second user 5 that is captured in the same direction as the direction in which the first user 4 after being moved views the first telepresence robot 1' that serves as an avatar of the second user 5 and at the distance equal to the distance between the first user 4 and the second telepresence robot 1'.

Figure 12:
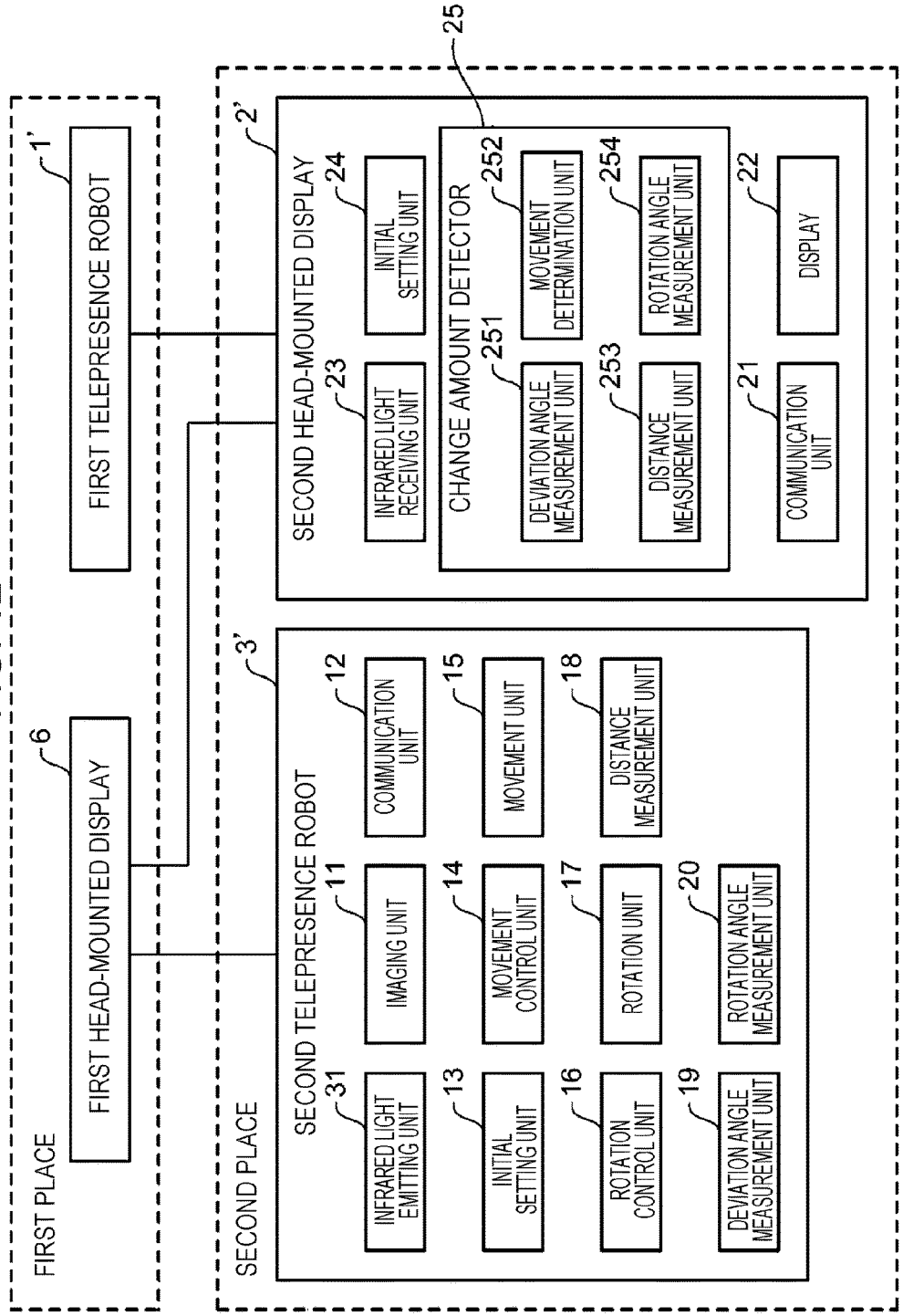
FIG. 12 illustrates a configuration of the second embodiment of the disclosure including a first telepresence robot, a first head-mounted display, a second head-mounted display, and a second telepresence robot.

FIG. 12 illustrates a configuration of the second embodiment of the disclosure including the first telepresence robot 1', the first head-mounted display 6, the second head-mounted display 2', and the second telepresence robot 3'. In FIG. 12, elements identical to those in the first embodiment are designated with the same reference numerals, and the detailed discussion thereof is omitted herein.

The second telepresence robot 3' includes the infrared light emitting unit 31, the imaging unit 11, the communication unit 12, the initial setting unit 13, the movement control unit 14, the movement unit 15, the rotation control unit 16, the rotation unit 17, the distance measurement unit 18, the deviation angle measurement unit 19, and the rotation angle measurement unit 20. The second telepresence robot 3' includes a processor (not illustrated), such as a CPU, and a memory (not illustrated) that has stored a program. By executing the program, the processor implements the infrared light emitting unit 31, the imaging unit 11, the communication unit 12, the initial setting unit 13, the movement control unit 14, the movement unit 15, the rotation control unit 16, the rotation unit 17, the distance measurement unit 18, the deviation angle measurement unit 19, and the rotation angle measurement unit 20.

The second head-mounted display 2' includes the communication unit 21, the display 22, the infrared light receiving unit 23, the initial setting unit 24, and the change amount detector 25 corresponding to a detector. The second head-mounted display 2' includes a processor (not illustrated), such as a CPU, and a memory (not illustrated) that has stored a program. By executing the program, the processor implements the communication unit 21, the display 22, the infrared light receiving unit 23, the initial setting unit 24, and the change amount detector 25.

The first telepresence robot 1' is identical in configuration to the second telepresence robot 3'. The first head-mounted display 6 is identical in configuration to the second head-mounted display 2'. The detailed description of these devices is thus omitted herein.

In accordance with the second embodiment, the first telepresence robot 1' corresponds to a first robot. The first robot is also referred to as an autonomous movement device. The second head-mounted display 2' corresponds to a first presentation device. The second telepresence robot 3' corresponds to a second robot. The first head-mounted display 6 corresponds to a second presentation device.

The second telepresence robot 3' autonomously moves while capturing an image of the second user 5 using the imaging unit 11 in the second place.

The change amount detector 25 corresponding to the detector of the first head-mounted display 6 detects a third amount of change indicating a change in the position of the first user 4 with reference to the first telepresence robot 1'. The change amount detector 25 further detects a fourth amount of change indicating a change in the orientation of the face of the first user 4 with reference to the first telepresence robot 1'. The detection method of the third and fourth amounts of change is identical to that of the first and second amounts of change in the first embodiment and the detailed discussion thereof is omitted herein. The display 22 in the first head-mounted display 6 presents the image captured by the second telepresence robot 3' to the first user 4 in the first place.

When the change amount detector 25 detects the first or second amount of change, the communication unit 21 in the second head-mounted display 2' transmits to the first head-mounted display 6 first notification information that prompts the first user 4 to stay still. The communication unit 21 in the second head-mounted display 2' then transmits the detected first or second amount of change to the first telepresence robot 1'.

The communication unit 21 in the first head-mounted display 6 receives the first notification information from the second head-mounted display 2'. If the first notification information is received from the second head-mounted display 2' before the change amount detector 25 detects the third or fourth amount of change, the display 22 in the first head-mounted display 6 displays the information that prompts the first user 4 to stay still. In this way, the first user 4 stays still if the first head-mounted display 6 displays the first notification information. In this case, the position of the first head-mounted display 6 worn by the first user 4 does not change. The second telepresence robot 3' moves in concert with the movement of the first user 4, and if the first user 4 stays still, the second telepresence robot 3' also stays still.

On the other hand, the communication unit 12 in the first telepresence robot 1' receives the first or second amount of change from the second head-mounted display 2'. For example, if the communication unit 12 in the first telepresence robot 1' receives the first amount of change from the second head-mounted display 2', the movement control unit 14 in the first telepresence robot 1' controls the movement unit 15, thereby moving the first telepresence robot 1' to the position responsive to the first amount of change. The movement operation has been described with reference to the first embodiment, and the detailed discussion thereof is omitted herein.

When the communication unit 12 in the first telepresence robot 1' receives the second amount of change from the second head-mounted display 2', the rotation control unit 16 in the first telepresence robot 1' controls the rotation unit 17, thereby rotating the first telepresence robot 1'. The rotation operation has been described in detail with reference to the first embodiment, the detailed discussion thereof is omitted herein.

When the second user 5 moves, the first telepresence robot 1' also moves in concert with the second user 5. The first user 4 and the second telepresence robot 3' stay still. The second head-mounted display 2' worn by the second user 5 may detect an amount of change in the relative position of the second head-mounted display 2' or an amount of change in the orientation of the face of the second user 5 with reference to the second telepresence robot 3'. The first user 4 is thus forced to stay still while the first telepresence robot 1' moves in concert with the second user 5.

When the first telepresence robot 1' moves in concert with the second user 5, the relative position of the first telepresence robot 1' after being moved with reference to the first telepresence robot 1' is identical to the relative position of the second head-mounted display 2' after being moved with reference to the second telepresence robot 3' corresponding to the first user 4. The shooting direction of the imaging unit 11 in the first telepresence robot 1' also changes in response to the orientation of the face of the second user 5.

When the change amount detector 25 detects the third or fourth amount of change, the communication unit 21 in the first head-mounted display 6 transmits to the second head-mounted display 2' second notification information that prompts the second user 5 to stay still. The communication unit 21 in the first head-mounted display 6 then transmits the third or fourth amount of change detected to the second telepresence robot 3'.

The communication unit 21 in the second head-mounted display 2' receives the second notification information from the first head-mounted display 6. If the second notification information is received before the change amount detector 25 detects the first or second amount of change, the display 22 in the second head-mounted display 2' displays information that prompts the second user 5 to stay still. The second user 5 thus stays still when the second head-mounted display 2' displays the second notification information. In this case, the second head-mounted display 2' worn by the second user 5 remains unchanged in position. The first telepresence robot 1' moves in concert with the movement of the second user 5, and if the second user 5 stays still, the first telepresence robot 1' also stays still.

The communication unit 12 in the second telepresence robot 3' receives the third or fourth amount of change from the first head-mounted display 6. For example, if the communication unit 12 in the second telepresence robot 3' receives the third amount of change from the first head-mounted display 6, the movement control unit 14 controls the movement unit 15, thereby moving the second telepresence robot 3 to the position responsive to the third amount of change. The movement operation has been described with reference to the first embodiment, and the detailed discussion thereof is omitted herein.

If the communication unit 12 in the second telepresence robot 3' receives the fourth amount of change from the first head-mounted display 6, the rotation control unit 16 in the second telepresence robot 3' controls the rotation unit 17, thereby rotating the second telepresence robot 3'. Since the rotation operation has been described with reference to the first embodiment, the detailed discussion thereof is omitted herein.

When the first user 4 moves, the second telepresence robot 3' also moves in concert with the first user 4, but the second user 5 and the first telepresence robot 1' stay still. The first head-mounted display 6 worn by the first user 4 may detect a change in the relative position of the first head-mounted display 6 or a change in the orientation of the first user 4 with reference to the first telepresence robot 1'. The second user 5 is forced to stay still while the second telepresence robot 3' moves in concert with the movement of the first user 4.

When the first user 4 moves and the second telepresence robot 3' moves in concert with the first user 4, the relative position of the second telepresence robot 3' after being moved with reference to the second user 5 is identical to the relative position of the first head-mounted display 6 after being moved with reference to the first telepresence robot 1' corresponding to the second user 5. The shooting direction of the imaging unit 11 in the second telepresence robot 3' changes in response to the orientation of the face of the first user 4.

When one of the first head-mounted display 6 and the second head-mounted display 2' moves, the information that prompts the other of the first head-mounted display 6 and the head-mounted display 2 to stay still is displayed. The one of the first head-mounted display 6 and the second head-mounted display 2' may move, and the other of the first head-mounted display 6 and the head-mounted display 2 may stay still. When one of the first telepresence robot 1' and the second telepresence robot 3' corresponding to one of the head-mounted displays moves, the other of the telepresence robots is set to stay still. This arrangement precludes both the first head-mounted display 6 and the second head-mounted display 2' from concurrently moving. Furthermore, this arrangement precludes both the first telepresence robot 1' and the second telepresence robot 3' from concurrently moving.

The remote communication method, the remote communication system, and the autonomous movement device of the embodiments of the disclosure find applications in a remote communication method of a remote communication system, the remote communication system, and an autonomous movement device, wherein the remote communication system includes a first robot that captures the image of a first user and autonomously moves in a first place, and a first presentation device that presents the image captured by the first robot to a second user, different from the first user, in a second place different from the first place, and provides the second user with the feeling of presence as if the first user in the first place were present in the second place.

What is claimed is:

1. A remote communication method of a remote communication system including a first robot deployed in a first place and a first presentation device deployed in a second place different from the first place, the remote communication method comprising:

capturing, using a camera of the first robot, an image of a first user in the first place;

transmitting, using the first robot, the captured image of the first user to the first presentation device;

receiving, using the first presentation device, the captured image from the first robot;

displaying, using the first presentation device, the captured image;

detecting, using the first presentation device, a first amount of change indicating a change in a position of a second user in the second place with reference to a second robot that virtually represents the first user;

transmitting, using the first presentation device, the first amount of change to the first robot;

receiving, using the first robot, the first amount of change from the first presentation device, the first robot moving to change a point of view of the camera in response to the first amount of change.

2. The remote communication method according to claim 1, wherein the first presentation device is worn by the second user, the communication method further comprises:

measuring, using the first presentation device, an initial distance between the second robot and the first presentation device when the second user wearing the first presentation device faces the second robot;

setting, using the first presentation device, a first polar coordinate system having an origin thereof at a position of the second robot, and setting a straight line connecting the position of the second robot to a position of the first presentation device to be a polar axis of the first polar coordinate system; and transmitting, using the first presentation device, the measured initial distance to the first robot, receiving, using the first robot, the initial distance from the first presentation device, the first robot moving to a position that is apart from the first user by the initial distance, wherein the position is a position at which the first robot faces to the first user; and setting, using the first robot, a second polar coordinate system having an origin thereof at a position of the first user, and setting a straight line connecting the position of the first robot to the position of the first user to be a polar axis of the second polar coordinate system.

3. The remote communication method according to claim 2, further comprising:

with the first presentation device moved in position in response to a movement of the second user, measuring, using the first presentation device, a distance between a position of the first presentation device after being moved and the position of the second robot in the first polar coordinate system;

measuring, using the first presentation device, an angle made by a straight line connecting the position of the first presentation device after being moved to the position of the second robot in the first polar coordinate system and the polar axis of the first polar coordinate system, wherein the first amount of change includes the measured distance and the measured angle; and identifying, using the first robot, in the first place a position to which the first robot is to be moved in response to the distance and the angle indicated by the first amount of change, wherein the first robot moves to the identified position in the moving in response to the first amount of change, and wherein a distance between the identified position and the position of the first user is equal to the distance indicated by the first amount of change, and an angle made between a straight line connecting the identified position to the position of the first user and the polar axis of the second polar coordinate system is equal to the angle indicated by the first amount of change.

4. The remote communication method according to claim 3, further comprising, determining, using the first presentation device, whether the measured angle is equal to or above a predetermined angle, wherein the first amount of change is detected when it is determined that the measured angle is equal to or above the predetermined angle.

5. The remote communication method according to claim 2, further comprising,
emitting, using the second robot, a visible light beam in a downward direction from a front of the second robot.

6. The remote communication method according to claim 2, further comprising,
emitting, using the second robot, an infrared light beam from a front of the second robot,
wherein the initial distance is measured when the infrared light beam, emitted from the second robot, is detected on a front of the first presentation device.

7. The remote communication method according to claim 2, further comprising:
detecting, using the first presentation device, a second amount of change indicating a change in an orientation of the second user's face;
receiving, using the first robot, the second amount of change from the first presentation device; and
changing, using the first robot, a shooting direction of the camera in response to the second amount of change by rotating the camera.

8. The remote communication method according to claim 7, wherein the detecting of the second amount of change comprises measuring an angle of rotation in the orientation of the second user's face with reference to the polar axis of the first polar coordinate system, wherein the measured angle of rotation is detected as the second amount of change,
wherein in the changing, the camera rotates until the angle of the shooting direction of the camera with reference to the polar axis of the second polar coordinate system matches the angle indicated by the second amount of change.

9. The remote communication method according to claim 7, wherein the remote communication system further includes a second presentation device deployed in the first place and worn by the first user, and
wherein the remote communication method further comprises:
with the first amount of change detected, transmitting, using the first presentation device, to the second presentation device, first notification information prompting the first user to stay still before the first amount of change is transmitted to the first robot;
with the second amount of change detected, transmitting, using the first presentation device, the first notification information to the second presentation device before the second amount of change is transmitted to the first robot;
receiving, using the second presentation device, the first notification information from the first presentation device; and
displaying, using the second presentation device, the first notification information on the second presentation device.

10. The remote communication method according to claim 9,
wherein the first notification information is displayed when the first notification information is received before the second presentation device detects a third amount of change indicating a change in the position of the first user with reference to the first robot; or
wherein the first notification information is displayed when the first notification information is received before the second presentation device detects a fourth amount of change indicating a change in the orientation of the first user's face with reference to the first robot.

11. The remote communication method according to claim 7,
wherein the remote communication system includes a second presentation device deployed in the first place,
wherein the second presentation device is worn by the first user, and
wherein the remote communication method further comprises:
transmitting, using the second presentation device, to the first presentation device, second notification information prompting the second user to stay still, when the second presentation device detects a third amount of change indicating a change in the position of the first user or a fourth amount of change indicating a change in the orientation of the first user's face with reference to the first robot;
receiving, using the first presentation device, the second notification information from the second presentation device; and
displaying, using the first presentation device, the second notification information on the first presentation device.

12. The remote communication method according to claim 11,
wherein the second notification information is displayed when the second notification information is received before the first presentation device detects the first amount of change, or
wherein the second notification information is displayed when the second notification information is received before the first presentation device detects the second amount of change.

13. A remote communication system comprising:
a first robot deployed in a first place; and
a presentation device deployed in a second place different from the first place,
wherein the first robot includes:
a camera that captures an image of a first user in the first place; and
a transmitter that transmits the image of the first user captured by the camera to the presentation device,
wherein the presentation device includes:
a receiver that receives the captured image from the first robot;
a display that displays the captured image;
a detector that detects a first amount of change in a position of a second user with reference to a second robot that virtually represents the first user; and
a transmitter that transmits the first amount of change to the first robot, and
wherein the first robot further includes:
a receiver that receives the first amount of change from the presentation device,
a mover that moves the first robot, and
a movement controller that controls the mover to change a point of view of the camera in response to the first amount of change.

14. A first robot comprising:
a camera that captures an image of a first user in a first place;
a transmitter that transmits the image of the first user captured by the camera to a presentation device deployed in a second place different from the first place; and
a receiver that receives from the presentation device a first amount of change indicating a change in a position of a second user with reference to a second robot that virtually represents the first user, wherein the first robot is deployed in the first place, and wherein the first robot further comprises:

a mover that moves the first robot deployed in the first place; and a movement controller that controls the mover to change a point of view of the camera of the first robot in response to the first amount of change.

15. The first robot according to claim 14, wherein the mover includes a motor that changes a position of the first robot, and the movement controller controls the motor of the mover to change the point of view of the camera of the first robot in response to the first amount of change.

16. The first robot according to claim 14, wherein the movement controller controls the mover to change a position of the first robot such that the position of the first robot with reference to a position of the first user corresponds to the position of the second user with reference to a position of the second robot.

* * * * *